(12) United States Patent
Sainath et al.

(10) Patent No.: US 10,403,269 B2
(45) Date of Patent: Sep. 3, 2019

(54) PROCESSING AUDIO WAVEFORMS (71) Applicant: Google LLC, Mountain View, CA (US)

(72) Inventors: Tara N. Sainath, Jersey City, NJ (US); Ron J. Weiss, New York, NY (US); Andrew W. Senior, New York, NY (US); Kevin William Wilson, Sleepy Hollow, NY (US)

(73) Assignee: Google LLC

( * ) Notice: Subject to any disclaimer, the term of this patent is extended or adjusted under 35 U.S.C. 154(b) by 545 days.

(21) Appl. No.: 15/080,927

(22) Filed: Mar. 25, 2016

(65) Prior Publication Data

US 2016/0284347 A1 Sep. 29, 2016

Related U.S. Application Data

(60) Provisional application No. 62/139,541, filed on Mar. 27, 2015.

(51) Int. Cl.
| | |
|---|---|
| *G10L 15/16* | (2006.01) |
| *G06N 3/04* | (2006.01) |
| *G06N 3/08* | (2006.01) |
| *G10L 15/26* | (2006.01) |
| *G10L 15/14* | (2006.01) |

(52) U.S. Cl.
CPC ............ *G10L 15/16* (2013.01); *G06N 3/0445* (2013.01); *G06N 3/0454* (2013.01); *G06N 3/084* (2013.01); *G10L 15/142* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 4,802,225 | A | 1/1989 | Patterson |
| 5,737,485 | A | 4/1998 | Flanagan |
| 5,805,771 | A | 9/1998 | Muthusamy et al. |
| 7,072,832 | B1 | 7/2006 | Su et al. |
| 7,702,599 | B2 | 4/2010 | Widrow |
| 8,843,369 | B1 | 9/2014 | Sharifi |
| 9,286,524 | B1 | 3/2016 | Mei |
| 9,390,712 | B2 | 7/2016 | Yu |
| 9,697,826 | B2 * | 7/2017 | Sainath .................. G10L 15/16 |

(Continued)

OTHER PUBLICATIONS

Palaz, Dimitri, and Ronan Collobert. "Analysis of cnn-based speech recognition system using raw speech as input," No. EPFL-REPORT-210039. Idiap, Jun. 2015, 7 pages.

(Continued)

*Primary Examiner* — Satwant K Singh
(74) *Attorney, Agent, or Firm* — Fish & Richardson P.C.

(57) ABSTRACT

Methods, systems, and apparatus, including computer programs encoded on a computer storage medium, for processing audio waveforms. In some implementations, a time-frequency feature representation is generated based on audio data. The time-frequency feature representation is input to an acoustic model comprising a trained artificial neural network. The trained artificial neural network comprising a frequency convolution layer, a memory layer, and one or more hidden layers. An output that is based on output of the trained artificial neural network is received. A transcription is provided, where the transcription is determined based on the output of the acoustic model.

20 Claims, 6 Drawing Sheets

(56) References Cited

U.S. PATENT DOCUMENTS

| | | | |
|---|---|---|---|
| 9,886,949 B2 * | 2/2018 | Li | G10L 15/16 |
| 9,984,683 B2 * | 5/2018 | Li | G10L 15/16 |
| 2005/0049855 A1 | 3/2005 | Chong-White | |
| 2009/0012638 A1 | 1/2009 | Lou | |
| 2010/0057453 A1 | 3/2010 | Valsan | |
| 2012/0065976 A1 | 3/2012 | Deng | |
| 2012/0275690 A1 | 11/2012 | Melvin | |
| 2014/0288928 A1 | 9/2014 | Penn | |
| 2015/0032449 A1 * | 1/2015 | Sainath | G10L 15/16 704/235 |
| 2015/0058004 A1 | 2/2015 | Dimitriadis et al. | |
| 2015/0066496 A1 | 3/2015 | Deoras | |
| 2015/0095026 A1 | 4/2015 | Bisani | |
| 2015/0095027 A1 | 4/2015 | Parada San Martin | |
| 2015/0161995 A1 | 6/2015 | Sainath | |
| 2015/0340034 A1 | 11/2015 | Schalkwyk | |
| 2016/0284346 A1 | 9/2016 | Visser | |
| 2016/0358602 A1 | 12/2016 | Krishnaswamy | |
| 2016/0358619 A1 | 12/2016 | Ramprashad | |
| 2017/0092265 A1 | 3/2017 | Sainath et al. | |
| 2017/0092297 A1 | 3/2017 | Sainath et al. | |
| 2018/0068675 A1 * | 3/2018 | Variani | G10L 25/30 |
| 2018/0174575 A1 * | 6/2018 | Bengio | G10L 15/16 |
| 2018/0197534 A1 * | 7/2018 | Li | G10L 15/16 |

OTHER PUBLICATIONS

Geiger, Jürgen T., et al. "Robust speech recognition using long short-term memory recurrent neural networks for hybrid acoustic modelling." Interspeech. 2014, 5 pages.

Liu, YuIan, Pengyuan Zhang, and Thomas Hain. "Using neural network front-ends on far field multiple microphones based speech recognition." Acoustics, Speech and Signal Processing (ICASSP), 2014 IEEE International Conference on. IEEE, 2014, 5 pages.

Renals, Steve, and Pawel Swietojanski. "Neural networks for distant speech recognition." Hands-free Speech Communication and Microphone Arrays (HSCMA), 2014 4th Joint Workshop on. IEEE, 2014, 5 pages.

Davis and Mermelstein, "Comparison of Parametric Representations for Monosyllabic Word Recognition in Continuously Spoken Sentences ," IEEE Transactions on Acoustics, Speech and Signal Processing, 28(4):357-366, Aug. 1980.

Dean et al., "Large Scale Distributed Deep Networks," Advances in Neural Information Processing Systems, pp. 1223-1231, 2012.

Glasberg and Moore, "Derivation of auditory filter shapes from notched-noise data," Hearing Research, vol. 47, No. 1, pp. 103-138, Aug. 1990.

Glorot and Bengio, "Understanding the Difficulty of Training Deep Feedforward Neural Networks," International Conference on Artificial Intelligence and Statistics (AISTATS), 2010, pp. 249-256.

Hain et al., "Transcribing Meetings with the AMIDA Systems," IEEE Transactions on Audio, Speech, and Language Processing, vol. 20, No. 2, pp. 486-498, Feb. 2012.

Heigold et al., "Asynchronous Stochastic Optimization for Sequence Training of Deep Neural Networks," Acoustics, Speech and Signal Processing (ICASSP), 2014 IEEE International Conference on, pp. 5587-5591, May 2014.

Hochreiter and Schmidhuber, "Long Short-Term Memory," Neural Computation, vol. 9, No. 8, pp. 1735-1780, 1997.

Hoshen et al., "Speech Acoustic Modeling from Raw Multichannel Waveforms," International Conference on Acoustics, Speech, and Signal Processing, IEEE, Apr. 2015, pp. 4624-4628.

Huang et al., "An Analysis of Convolutional Neural Networks for Speech Recognition," Acoustics, Speech and Signal Processing (ICASSP), 2015 IEEE International Conference on. IEEE, Apr. 2015, pp. 4989-4993.

Jaitly and Hinton, "Learning a Better Representation of Speech Sound Waves Using Restricted Boltzmann Machines," in Proc. ICASSP, 2011, 4 pages.

Kim and Chin, "Sound Source Separation Algorithm Using Phase Difference and Angle Distribution Modeling Near the Target," in Proc. INTERSPEECH, 2015, 5 pages.

Mohamed et al., "Understanding how Deep Belief Networks Perform Acoustic Modelling," ICASSP, Mar. 2012, pp. 4273-4276.

Palaz et al., "Estimating Phoneme Class Conditional Probabilities From Raw Speech Signal using Convolutional Neural Networks," in Proc. INTERSPEECH, 2014, 5 pages.

Patterson et al., "An efficient auditory filterbank based on the gammatone function," in a meeting of the IOC Speech Group on Auditory Modelling at RSRE, vol. 2, No. 7, 1987, 33 pages.

Sainath et al., "Convolutional, Long Short-Term Memory, Fully Connected Deep Neural Networks," Acoustics, Speech and Signal Processing (ICASSP), 2015 IEEE International Conference on, pp. 4580-4584, Apr. 2015.

Sainath et al., "Deep Convolutional Neural Networks for LVCSR," in Proc. ICASSP, May 2013, 5 pages.

Sainath et al., "Improvements to Deep Convolutional Neural Networks for LVCSR," Automatic Speech Recognition and Understanding (ASRU), 2013 IEEE Workshop on, pp. 315-320, Dec. 2013.

Sainath et al., "Learning the Speech Front-end with Raw Waveform CLDNNs," in INTERSPEECH, Sep. 2015, pp. 1-5.

Sak et al., "Long Short-Term Memory Recurrent Neural Network Architectures for Large Scale Acoustic Modeling," in Proc. INTERSPEECH, pp. 338-342, Sep. 2014.

Schluter et al., "Gammatone Features and Feature Combination for Large Vocabulary Speech Recognition," Acoustics, Speech and Signal Processing, 2007. ICASSP 2007. IEEE International Conference on, pp. IV-649-IV-652, Apr. 2007.

Seltzer et al., "Likelihood-maximizing Beamforming for Robust Handsfree Speech Recognition," IEEE Transactions on Audio, Speech and Language Processing, No. 5, pp. 489-498, Sep. 2004.

Soltau et al., "The IBM Attila speech recognition toolkit," in Proc. IEEE Workshop on Spoken Language Technology, 2010, Dec. 2010, pp. 97-102.

Stolcke et al., "The SRI-ICSI Spring 2007 Meeting and Lecture Recognition System," Multimodal Technologies for Perception of Humans, vol. Lecture Notes in Computer Science, No. 2, pp. 450-463, 2008.

Swietojanski et al., "Hybrid Acoustic Models for Distant and Multichannel Large Vocabulary Speech Recognition," Automatic Speech Recognition and Understanding (ASRU), 2013 IEEE Workshop on. IEEE, Dec. 2013, pp. 285-290.

Tuske et al., "Acoustic Modeling with Deep Neural Networks using Raw Time Signal for LVCSR," in Proc. In INTERSPEECH, Sep. 2014, pp. 890-894.

Sainath. "Towards End-to-End Speech Recognition Using Deep Neural Networks," PowerPoint presentation, Deep Learning Workshop, ICML, Jul. 10, 2015, 51 pages.

"Voice activity detection," from Wikipedia, the free encyclopedia, last modified on Jul. 23, 2015 [retrieved on Oct. 21, 2015]. Retrieved from the Internet: URL<http://en.wikipedia.org/wiki/Voice_activity_detection>, 5 pages.

Abdel-Hamid et al. "Applying convolutional neural networks concepts to hybrid NN-HMM model for speech recognition.", IEEE International Conference on Acoustics, Speech and Signal Processing (ICASSP), Mar. 2012, 4 pages.

Allen and Berkley, "Image method for efficiently simulating small-room acoustics," J. Acoust. Soc. Am. 65(4):943-950, Apr. 1979.

Benesty et al., "Microphone Array Signal Processing," Springer Topics in Signal Processing, Mar. 2008, 193 pages.

Brandstein and Ward, "Microphone Arrays: Signal Processing Techniques and Applications," Digital Signal Processing, May 2001, 258 pages.

Burlick et al., "An Augmented Multi-Tiered Classifier for Instantaneous Multi-Modal Voice Activity Detection," INTERSPEECH 2013, 5 pages, Aug. 2013.

Chuangsuwanich and Glass, "Robust Voice Activity Detector for Real World Applications Using Harmonicity and Modulation frequency," INTERSPEECH, pp. 2645-2648, Aug. 2011.

(56) References Cited

OTHER PUBLICATIONS

Delcroix et al., "Linear Prediction-Based Dereverberation With Advanced Speech Enhancement and Recognition Technologies for the Reverb Challenge," REVERB Workshop 2014, pp. 1-8, May 2014.
Eyben et al., "Real-life voice activity detection with LSTM Recurrent Neural Networks and an application to Hollywood movies," 2013 IEEE International Conference on Acoustics, Speech and Signal Processing (ICASSP); May 2013, Institute of Electrical and Electronics Engineers, May 26, 2013, pp. 483-487, XP032509188.
Ferroni et al., "Neural Networks Based Methods for Voice Activity Detection in a Multi-room Domestic Environment," Proc. of EVALITA as part of XIII AI*IA Symposium on Artificial Intelligence, vol. 2, pp. 153-158, Dec. 2014.
Ganapathy et al, "Robust language identification using convolutional neural network features", Fifteenth Annual Conference of the International Speech Communication Association, Mar. 2014, 5 pages.
Ghosh et al., "Robust Voice Activity Detection Using Long-Term Signal Variability," IEEE Transactions on Audio, Speech, and Language Processing, 19(3):600-613, Mar. 2011.
Giri et al., "Improving Speech Recognition in Reverberation Using a Room-Aware Deep Neural Network and Multi-Task Learning," 2015 IEEE International Conference on Acoustics, Speech and Signal Processing (ICASSP), pp. 5014-5018, Apr. 2015.
Graves et al., "Speech Recognition With Deep Recurrent Neural Networks," Acoustics, Speech and Signal Processing (ICASSP), 2013 IEEE International Conference on, pp. 6645-6649, May 2013.
Hinton et al., "Deep Neural Networks for Acoustic Modeling in Speech Recognition," Signal Processing Magazine, IEEE, 29(6):82-97, Apr. 2012.
Hughes and Mierle, "Recurrent Neural Networks for Voice Activity Detection," Acoustics, Speech and Signal Processing (ICASSP), 2013 IEEE International Conference on, pp. 7378-7382, May 2013.
International Preliminary Report on Patentability issued in International Application No. PCT/US2016/043552, dated Apr. 5, 2018, 8 pages.
International Search Report and Written Opinion in International Application No. PCT/US2016/043552, dated Sep. 23, 2016, 12 pages.
Isogai et al. "Dynamic Programming—Automatic Endpoint Detection for Neural Network Speech Recognition," Paper of the Japan Acoustical Society Research Presentation Conference, Spring I, Mar. 1990, (English Abstract).
Kello and Plaut, "A neural network model of the articulatory-acoustic forward mapping trained on recordings of articulatory parameters," J. Acoust. Soc. Am. 116 (4), Pt. 1, pp. 2354-2364, Oct. 2004.
Maas et al., "Recurrent Neural Networks for Noise Reduction in Robust ASR," INTERSPEECH 2012, 4 pages, Sep. 2012.
Misra, "Speech/Nonspeech Segmentation in Web Videos," Proceedings of INTERSPEECH 2012, 4 pages, Sep. 2012.

Mohamed, "Deep neural network acoustic models for asr." PhD Dissertation, Doctor of Philosophy, Graduate Department of Computer Science, University of Toronto, Year 2014, pp. 1-120.
Nakatani et al. "Investigation of Deep Neural Network and Cross-Adaptation for Voice Activity Detection in Meeting Speech," Technical Research Report of the Institute of Electronics, Information and communication Engineers, Japan, Dec. 2014, 6 pages (English Abstract).
Narayanan and Wang, "Ideal Ratio Mask Estimation Using Deep Neural Networks for Robust Speech Recognition," Acoustics, Speech and Signal Processing (ICASSP), 2013 IEEE International Conference on, pp. 7092-7096, May 2013.
Palaz et al, "Estimating phoneme class conditional probabilities from raw speech signal using convolutional neural networks." arXiv preprint arXiv: 1304.1018v2, Jun. 12, 2013, 5 pages.
Sainath, et al. "Improvements to deep neural networks for large vocabulary continuous speech recognition tasks.", IBM TJ Watson Research Center, Jan. 2014, 57 pages.
Stolcke et al., "The SRI-ICSI Spring 2007 Meeting and Lecture Recognition System," Proc. NIST Rich Transcription Workshop, Springer Lecture Notes in Computer Science, 14 pages, 2007.
Swietojanski et al, "Convolutional Neural Networks for Distant Speech Recognition," IEEE Signal Processing Letters, vol. 21, No. 9, May 2014, 5 pages.
Thomas et al., "Analyzing convolutional neural networks for speech activity detection in mismatched acoustic conditions," 2014 IEEE International Conference on Acoustics, Speech and Signal Processing (ICASSP), IEEE, May 4, 2014, pp. 2519-2523, XP032617994.
Thomas et al., "Improvements to the IBM Speech Activity Detection System for the DARPA RATS Program," Proceedings of IEEE International Conference on Audio, Speech and Signal Processing (ICASSP), pp. 4500-4504, Apr. 2015.
Van Veen and Buckley, "Beamforming: A Versatile Approach to Spatial Filtering," ASSP Magazine, IEEE, 5(2):4-24, Apr. 1988.
Weiss and Kristjansson, "DySANA: Dynamic Speech and Noise Adaptation for Voice Activity Detection," Proc. of INTERSPEECH 2008, pp. 127-130, Sep. 2008.
Yu et al., "Feature Learning in Deep Neural Networks—Studies on Speech Recognition Tasks," arXiv:1301.3605v3 [cs.LG], pp. 1-9, Mar. 2013.
Zelinski, "A Microphone Array With Adaptive Post-Filtering for Noise Reduction in Reverberant Rooms," Acoustics, Speech, and Signal Processing, 1988. ICASSP-88., 1988 International Conference on, vol. 5, pp. 2578-2581, Apr. 1988.
Zeng et al., "Convolutional Neural Networks for human activity recognition using mobile sensors," International Conference on Mobile Computing, Applications and Services, Austin, TX, dated Nov. 6, 2014, pp. 197-205.
Zhang and Wang, "Boosted Deep Neural Networks and Multi-resolution Cochleagram Features for Voice Activity Detection," INTERSPEECH 2014, pp. 1534-1538, Sep. 2014.

\* cited by examiner

PROCESSING AUDIO WAVEFORMS

CROSS-REFERENCE TO RELATED APPLICATION

This application claims priority to U.S. Provisional Application No. 62/139,541, filed on Mar. 27, 2015. The entire contents of U.S. Provisional Application No. 62/139,541 are incorporated herein by reference.

TECHNICAL FIELD

This specification generally relates to processing audio waveforms.

BACKGROUND

Various techniques can be used to recognize speech. Some techniques use an acoustic model that receives acoustic features derived from audio data. Frequently, speech recognition systems input values for generic or manually-defined features to acoustic models used for speech recognition.

SUMMARY

In general, the processing of audio waveforms for speech recognition and other tasks can be enhanced using various neural network processing techniques. For example, an acoustic model for speech recognition can use convolution in the time domain and/or frequency domain, custom-trained filters, a neural network with memory layers, or a combination of these features. In one example, an architecture for a raw waveform convolutional long short-term memory deep neural network ("CLDNN") acoustic model is provided. The CLDNN may be capable of learning directly from raw waveforms. The architecture and its associated processes may allow for reduction in time-domain variations due to phase shifts. The architecture may also allow discovery of features which maintain locality in frequency. Various aspects of a speech-recognizer's front-end processing of audio data can be learned using machine learning techniques, and parameters for speech feature extraction can be learned jointly with parameters for a neural network acoustic model.

In some implementations, audio waveform data is convolved in the time domain with filters, e.g., finite impulse response (FIR) filters, before being input to a DNN-based language model. The filter parameters can be learned through a training process so that the parameters are tailored to a particular application, such as speech recognition. The output of the time convolution may be further convolved in the frequency domain, for example, with a convolutional layer of a neural network. Further processing by a neural network that includes memory layers can enhance the ability of the acoustic model to deal with phase shifts and other audio variations.

Some speech recognition systems use manually-defined audio features as input, such as log-mel features. The process of extracting these features necessarily removes some audio information while retaining other information from the original audio waveform. Standardized feature representations may not be ideal for a particular classification objective, since they may not capture all the significant information for a given application. In the case of speech recognition, manually-defined features may not provide a speech recognition system all the information indicative of the words that the user spoke.

To avoid unnecessarily limiting the information provided to an acoustic model, an acoustic model architecture can be configured to process raw audio waveforms. In some implementations, rather than training an acoustic model using pre-defined features, the parameters of filters or other modules used to process the audio waveforms can be trained jointly with the neural network of the acoustic model. As a result, the filters are trained to identify learned features appropriate for the objectives of the model, while the acoustic model learns to process the learned features to perform classification. The filter parameters are learned for the particular application, and so can adapted for the specific application for which the model is intended. As a result, the system can capture and use information from a raw waveform that is more relevant to word error rate than hand-crafted features or features designed before training of the acoustic model. In one general aspect, a method can be performed by one or more computing devices. The method includes: generating a time-frequency feature representation based on audio data; inputting the time-frequency feature representation to an acoustic model comprising a trained artificial neural network, the trained artificial neural network comprising a frequency convolution layer, a memory layer, and one or more hidden layers; receiving, from the acoustic model, an output that is based on output of the trained artificial neural network and that is indicative of a likelihood that the audio data corresponds to a phonetic unit; and providing a transcription for the audio data that is determined based on the output of the acoustic model.

Other implementations of these and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, generating the time-frequency feature representation based on audio data comprises generating feature values by convolving samples of audio waveform data with one or more filters in the time domain. The memory may include a long short-term memory layer. In some examples, the acoustic model may include multiple long short-term memory layers. In addition, the trained artificial neural network is configured such that output of at least one of the long short-term memory layers may be provided as input to another of the long short-term memory layers. In some implementations, the artificial neural network is an artificial neural network in which: a first long short-term memory layer receives input from the frequency convolution layer, the first long short-term memory layer provides output to a series of one or more other long short-term memory layers, and the output from the series of one or more other long short-term memory layers is provided to a series of multiple hidden neural network layers, e.g., a deep neural network. In some aspects, generating the time-frequency feature representation based on the set of audio waveform samples may include inputting waveform samples from the audio data to a time convolutional module and receiving an output from the time convolutional module. The method may include receiving the audio data from a client device over a network; and providing the transcription for the audio data comprises providing the transcription to the client device over the network, for display at the client device.

Implementations may include one or more of the following features. For example, generating the time-frequency feature representation may include convolving time-domain features of audio waveform samples with each of a plurality of finite impulse response filters and time averaging the results of the convolution over a particular time window. In some implementations, generating the time-frequency feature representation may include generating the time-frequency feature representation using a set of multiple learned filters that were trained jointly with the artificial neural network of the acoustic model.

Implementations may include one or more of the following features. For example, the method may include: obtaining audio data that includes a plurality of audio waveform samples; and identifying a particular set of the audio waveform samples that occur within a time window. Generating the time-frequency representation may include generating the time-frequency representation based on the particular set of audio waveform samples.

For example, identifying the particular set of the audio waveform samples that occur within a time window may include identifying the audio waveform samples corresponding to a frame. In some implementations, generating the time-frequency feature representation based on the particular set of audio waveform samples may include convolving the audio waveform samples corresponding to the frame with each filter in a set of multiple finite impulse response filters in a filterbank, collapsing outputs of the filterbank using a pooling function to discard short-term phase information and generate an output for each of the filters with respect to the frame, applying a non-linear rectifying function to the collapsed filterbank outputs, applying a stabilized logarithm compression function to the rectified outputs, determining, as the time-frequency feature representation, a frame-level feature vector comprising the outputs of the stabilized logarithm compression function.

Implementations may include one or more of the following features. For example, determining log-mel features based on the audio waveform samples that occur within the time window and providing data indicating the log-mel features to the acoustic model. In some implementations, receiving an output from the trained artificial neural network of the acoustic model may include receiving an output from the trained artificial neural network that is based on (i) the time-frequency feature representation and (ii) the log-mel features. The output of the acoustic model may, in some examples, indicate a likelihood that a portion of the utterance corresponding to the identified features represents a particular context-dependent state. The context-dependent state may be a context-dependent hidden Markov model state corresponding to a phoneme or a portion of a phoneme. The context-dependent state may represent the occurrence of a phonetic unit in the context of a surrounding phonetic context, e.g., a sequence of one or more phonetic units immediately before the phonetic unit and/or a sequence of one or more phonetic units immediately following the phonetic unit. The artificial neural network may have been trained using sequence training, cross-entropy training, or truncated backpropagation through time. In some examples, the time-frequency feature representation may not be a log-mel feature.

Implementations may include one or more of the following features. For example, identifying, in the audio data, multiple different sets of the audio waveform samples that occur in different consecutive time windows and repeating the generating, inputting, and receiving steps for each of the multiple different sets of audio waveform samples to obtain an output of the artificial neural network for each of the different consecutive time windows. In some implementations, determining the transcription for the utterance may include determining the transcription for the utterance based on the outputs of the trained artificial neural network for each of the different consecutive time windows. Obtaining audio data corresponding to an utterance may include receiving, over a computer network and from a client device, audio data representing an utterance detected by a microphone of the client device. In some examples, providing the transcription may include providing, over the computer network and to the client device, data indicating the transcription for display at a screen of the client device.

In another general aspect, a method performed by one or more computing devices includes: obtaining an artificial neural network comprising (i) a frequency convolution layer (ii) a memory layer, and (iii) one or more hidden layers; obtaining training data that includes audio waveform samples from utterances and transcriptions for the utterances; and using the training data to jointly train (i) a set of filters that are used to generate feature values from audio waveform samples and (ii) the artificial neural network, the artificial neural network receiving the feature values during the training.

Implementations may include one or more of the following features. For example, jointly training parameters of the set of filters and parameters of the artificial neural network includes convolving a set of audio samples with the set of filters to generate feature values, and providing the feature values as input to the artificial neural network. The training can include updating one or more parameters of the set of filters based on the training data, and updating one or more parameters of the artificial neural network based on the training input. For example, the training system can identify a transcription for an utterance, align a phonetic representation of the transcription with audio data for the utterance, and determine a target output. The target output can indicate a phonetic unit or context-dependent state corresponding to a frame of audio data comprising multiple audio waveform samples. The target output may indicate a probability of a phonetic unit or context-dependent state, or the target output may indicate a probability distribution. The set of filters can be used to obtain feature values based on the frame of audio data, and the feature values are input to the neural network. Sequence training, cross-entropy training, or truncated back-propagation can be used to adjust parameters of the artificial neural network, such as transition weights between nodes of the artificial neural network. For example, differences between the output of the neural network and the target output may be used to adjust the neural network so that the neural network provides an output, given the same input feature values, that is closer to the target output. In addition, or as an alternative, the parameters of the set of filters can be adjusted so that adjusted feature values are generated when the adjusted set of filters is used to generate feature values from the frame of audio data. The parameters of the set of filters can be adjusted so that the output of the neural network in response to receiving the adjusted feature values is closer to the target output than the output of the neural network in response to receiving feature vectors produced using the set of filters before adjustment. The training process can be repeated during multiple iterations. Each of multiple iterations of the training may use different audio data of the training data. For example, various iterations of training may use audio for utterances from different speakers, or use different utterances of a single speaker, or may use different portions of a same utterance. Each of multiple iterations can use different sets of parameters for the set of filters, so that the feature values generated using different filter configurations are provided to the neural network during different training iterations.

In some implementations, the techniques disclosed herein may provide one or more of the following advantages. The accuracy of a speech recognition system can be improved, resulting in a reduced word error rate. The acoustic model can more accurately process audio samples having short-term phase variations. The audio characteristics that are passed to an acoustic model can be adjusted according to the training data used to train the acoustic model, allowing the system to learn which audio characteristics are most indicative of speech content. The need to design or select speech features prior to training an acoustic model can be reduced or eliminated.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One of the difficulties in modeling raw waveforms is that perceptually and semantically identical sounds can appear at different phase shifts. Performance can be enhanced by utilizing a representation that is invariant to small phase shifts. Phase invariance can be achieved using convolutional layers which pool in time or deep neural network ("DNN") layers with large, potentially overcomplete, hidden units, which can capture the same filter shape at a variety of phases. Long short-term memory ("LSTM") Recurrent Neural Networks are good for sequential tasks, and are therefore useful in modeling longer term temporal structure.

Using an LSTM directly on the raw waveform can involve a large amount of samples. For example, 25 milliseconds of data, which is a typical frame duration in feature extraction for speech recognition, corresponds to 400 samples at a 16 kHz sampling rate. Modeling the time-domain sequence sample-by-sample would require unrolling the LSTM for an extraordinary number of time steps, which even for LSTMs is difficult. Therefore, a convolution in time approach may be used to model raw waveforms on the short frame-level timescale. The output from the convolution in time layer is then passed to a powerful acoustic model, namely a Convolutional, Long Short-Term Memory Deep Neural Network ("CLDNN"). The CLDNN may perform (i) frequency convolution to reduce spectral variance, (ii) long-term temporal modeling with the LSTM layers, and (iii) discrimination with the DNN layers. The raw time convolution layer may be trained jointly with the CLDNN.

Experiments performed on the raw waveform CLDNN were conducted on a 2,000 hour English Voice Search task. Results of the experiments indicate the raw waveform CLDNN architecture matches the performance of log-mel CLDNN after both cross-entropy and sequence training. With respect to other approaches, the raw waveform CLDNN architecture described herein is the first architecture that is able to match the performance of raw waveform and log-mel on a large-vocabulary continuous speech recognition ("LVCSR") task using a strong baseline acoustic model. Results of analysis of the CLDNN architecture for raw waveforms indicate that if an acoustic model that removes the convolution in time or LSTM layers is used, the log-mel acoustic model may provide better performance than the raw waveform acoustic model. This highlights the advantages of convolutional neural network ("CNN") and LSTM layers. Analysis on the learned raw waveform filters indicates that log-mel filters are complementary to learned raw waveform filters, which indicates that improvements can be obtained by combining these streams.

The techniques discussed below include an architecture for a raw waveform convolutional long short-term memory deep neural network acoustic model capable of learning directly from raw waveforms, as well as training and run-time processes associated with the raw waveform CLDNN architecture. This architecture uses a convolution in time approach to model raw waveforms on a short frame-level timescale that is provided to a CLDNN. The CLDNN may perform frequency convolution to reduce spectral variance, long-term temporal modeling with the long short-term memory LSTM layers, and discrimination with the DNN layers. The time convolution layer functions in conjunction with the CLDNN, and can be trained jointly with the CLDNN. This architecture and its associated processes may allow for reduction in time-domain variations due to phase shifts and discovery of features which maintain locality in frequency. In some implementations, this architecture may be used for LVCSR.

Figure 1:
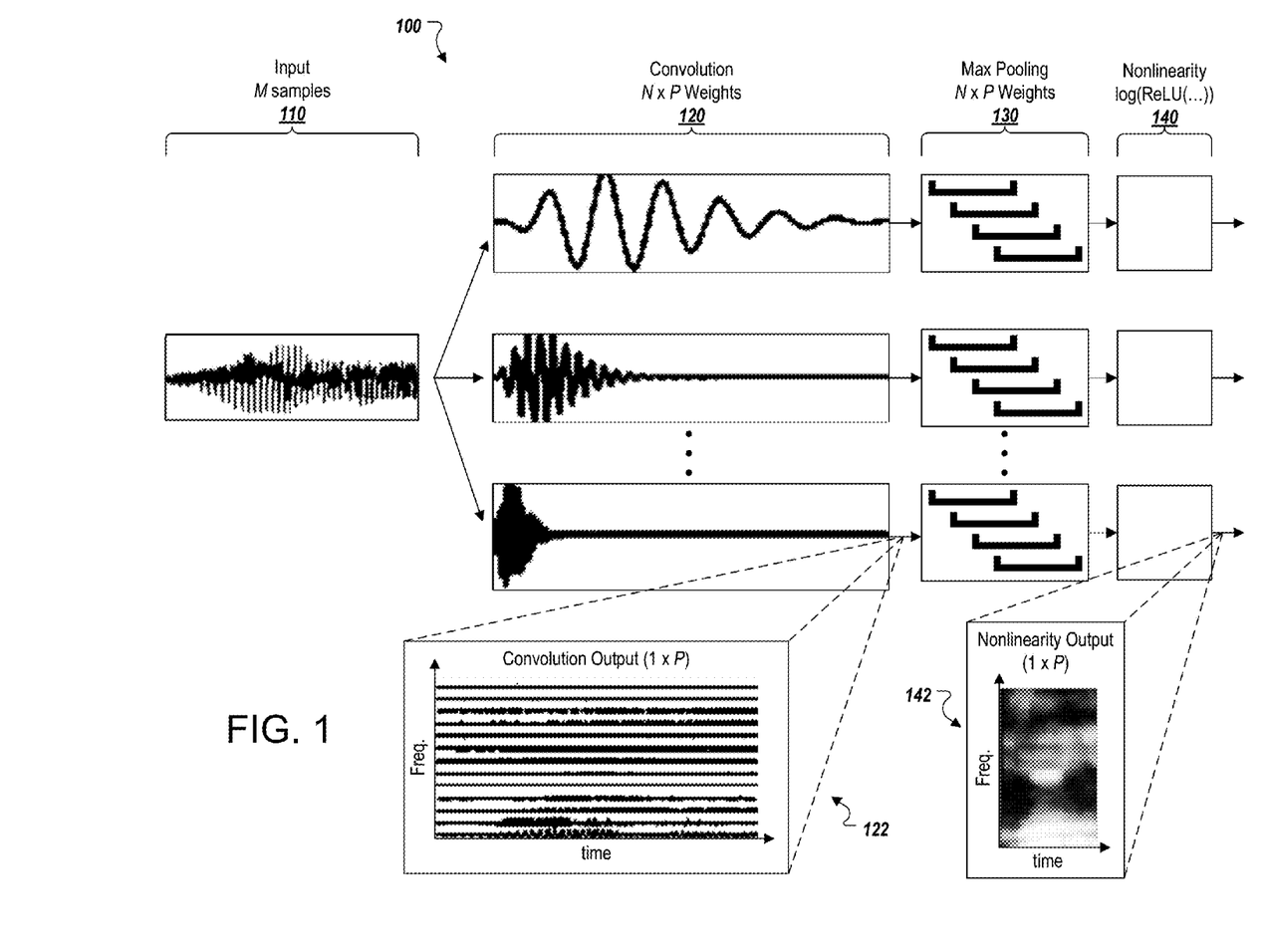
FIG. 1 is a conceptual diagram of an exemplary framework for processing audio waveforms in a time-domain convolution layer.

FIG. 1 is a conceptual diagram of an exemplary framework for processing raw waveforms in a time-domain convolution layer 100. Time-domain convolution layer 100 may determine one or more frame-level time-domain features from a raw waveform input 110. In some implementations, the one or more time-domain features may include gammatone features. The output of time-domain convolution layer 100 may be provided to the CLDNN.

Raw waveform 110 may be provided to time-domain convolution layer 100 as an input. For example, raw waveform 110 may be audio data corresponding to an utterance. In some implementations, raw waveform 110 may be a relatively small window, e.g., 25 to 35 milliseconds, of raw waveform samples of length M. Raw waveform 110 may be convolved with a filterbank 120 that includes P filters. In some implementations, one or more characteristics of filterbank 120 may be adaptive so as to enable filterbank learning. Each convolutional filter of filterbank 120 may be, for instance, a finite impulse response ("FIR") filter with a length of N. For example, an output from the convolution may be M−N+1×P in time×frequency. An exemplary convolution output of filterbank 120 can be seen at 122.

The output of the filterbank 120, e.g., convolution output 122, may be collapsed in time using a pooling function 130. This may discard short term phase information, such as phase shifts produced as a result of time-domain filtering. Such phase shifts may, for instance, exist between sinusoidal components of the raw waveform. In some implementations, the pooling function 130 may be applied over the entire time length of the convolution output to produce 1×P outputs. Rectified non-linearity, e.g., half-wave rectification, and a stabilized logarithm compression may be applied to the collapsed output, at 140, to produce a frame-level feature vector at time t, which may be denoted as:

$$x_t \in \Re^P \tag{1}$$

In some implementations, the stabilized logarithm may be applied using a relatively small additive offset, e.g., log(·+ 0.01)), to truncate the output range and avoid numerical problems with very small inputs. An exemplary frame-level feature vector, which is also herein referred to as a "time-frequency feature representation," can be seen at 142. The window of the raw waveform may be subsequently shifted, e.g., by 10 milliseconds, and the processes described above in association with time-domain convolution layer 100 may be repeated for the next windowed signal. This may provide a set of time-frequency frames at 10 ms intervals. In some implementations, one or more time-averaging operations may be performed over a window to compute frame-level time-frequency features.

It can be noted that the time-frequency feature representation is not a log-mel feature, and is rather tailored to the particular task at hand, such as word error rate minimization.

Figure 2:
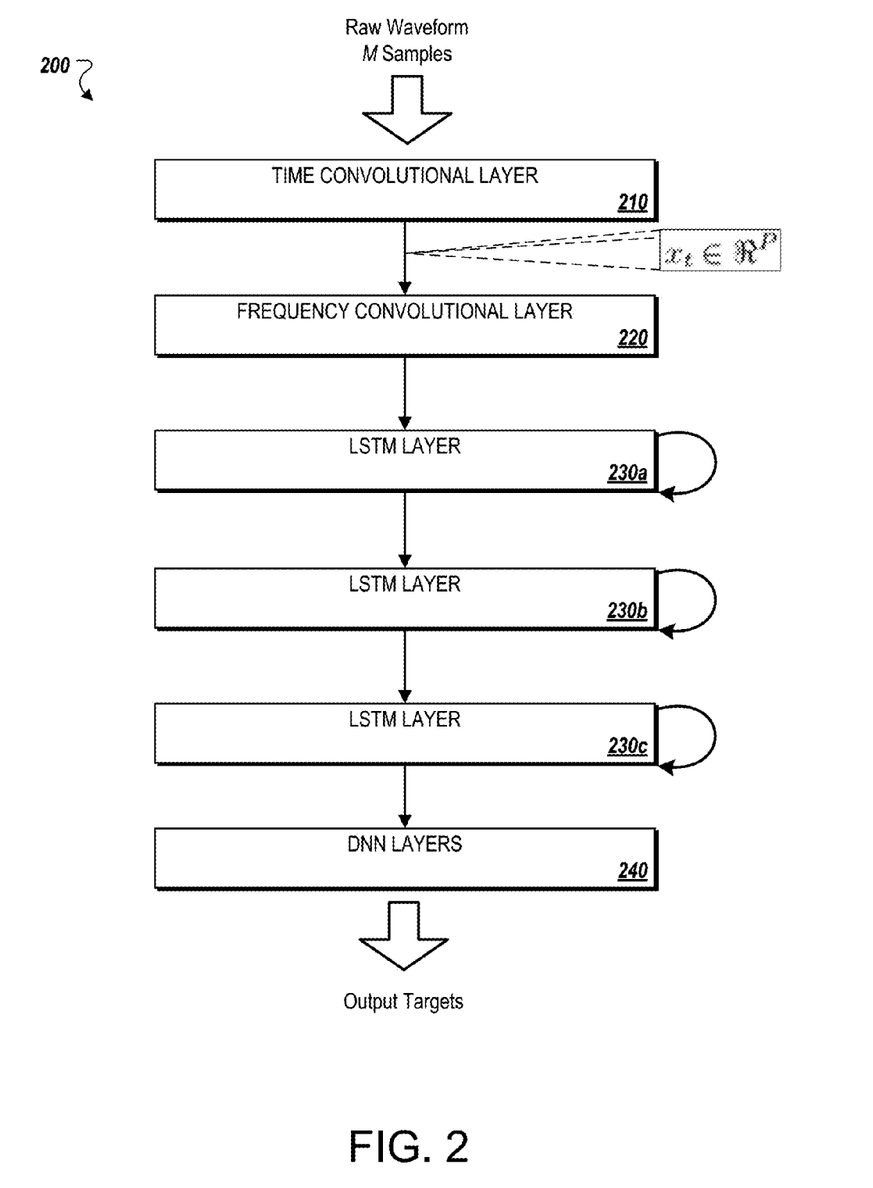
FIG. 2 is a conceptual diagram of an exemplary framework for a convolutional long short-term memory deep neural network.

FIG. 2 is a conceptual diagram of an exemplary framework for a raw waveform convolutional long short-term memory deep neural network. A frame-level feature output by a time convolution layer 210 may be passed to a CLDNN acoustic model that predicts context dependent state output targets. For instance, time convolution layer 210 may be time-domain convolution layer 100. By nature of its domain, the output of the time convolutional layer 210 has meaning in the frequency domain.

A frequency convolution layer 220 may perform frequency convolution on the frame-level feature, or time-frequency feature representation, output by time convolution layer 210. This may, for instance, be performed to reduce spectral variations in $x_t$. Frequency convolution layer 220 may include one convolutional layer with a plurality of feature maps. For example, frequency convolution layer 220 may include 256 feature maps. In this example, an 8×1 frequency-time filter may be used for the convolutional layer. The pooling strategy associated with frequency convolution layer 220 may include non-overlapping max pooling and, for instance, with pooling in frequency only being performed with a pooling size of 3.

The output of the frequency convolution layer 220 may be passed to LSTM layers 230A-C, which are appropriate to modeling the signal in time. In some implementations, three LSTM layers are used. In these implementations, each LSTM layer may include 832 cells and a 512 unit projection layer for dimensionality reduction. In some examples, there are more than three LSTM layers. In such implementations, each LSTM layer may include fewer cells.

The LSTM output may be provided to one or more DNN layers 240. The layers included in one or more DNN layers 240 may be fully-connected and, in some implementations, may each have 1,024 hidden units. Time convolution layer 210 may be trained jointly with the rest of the convolutional long short-term memory deep neural network. Filtering techniques utilized in the time convolution layer, such as those described above in association with FIG. 1, may be adapted in accordance with such training.

During training, the raw waveform convolutional long short-term memory deep neural network may be unrolled for 20 time steps for training with truncated backpropagation through time (BPTT). In some implementations, the output state label may be delayed by one or more frames, as information about future frames may enhance the accuracy of predictions associated with a current frame. In examples that include providing audio data corresponding to an utterance as input, the output targets of the raw waveform CLDNN may provide for transcription of the utterance.

Table 1 shows results associated with various experiments. First, notice that if the filter size is the same as the window size, and thus we do not pool in time, the word error rate ("WER") is relatively high (19.9%). However, if we use a slightly larger window size (35 ms), which allows us to pool in time and reduce variations due to phase shifts, we can improve WER to 16.4%. While one can argue that phase shifts can be captured using a large enough number of hidden units, a time-domain convolution is attractive as it does not increase parameters over the 25 ms input, no pooling system.

TABLE 1

WER for Raw waveform CLDNNs

| Filter Size (N (ms)) | Window Size (M (ms)) | Init | WER |
| --- | --- | --- | --- |
| 400 (25 ms) | 400 (25 ms) | random | 19.9 |
| 400 (25 ms) | 560 (35 ms) | random | 16.4 |
| 400 (25 ms) | 560 (35 ms) | gammatone | 16.2 |
| 400 (25 ms) | 560 (35 ms) | gammatone untrained | 16.4 |

Second, Table 1 shows that we can improve performance slightly, from 16.4% to 16.2% by initializing the time-domain convolution parameters to have gammatone impulse responses with center frequencies equally spaced on an equivalent rectangular bandwidth ("ERB") scale, rather than random initialization. This differs from previous work which showed gammatone initialization was the same as random initialization. The frequency convolutional layer in the raw waveform CLDNN described herein may require features to have locality in frequency. Therefore, initializing the time-domain convolutional layer preceding this with weights that initially allow for locality in frequency puts the weights in a much better space. Finally, notice that not training the time-convolutional layer is slightly worse than training the time convolution layer. This shows the benefit of adapting filters for the objective at hand, rather than using hand-designed filters.

Different non-linearities can be accounted for. For example, logarithmic compression or 10th-root compression may be used when training a neural network. The millions of weights in the raw waveform CLDNN after the compression layer can potentially learn to account for small differences with different compression schemes.

Similarly, different pooling strategies can be employed. Gammatone features are often computed by taking a time-domain average over a 40 ms window. Since pooling mimics time subsampling, we compare 3 different pooling operations, namely max, 12 and average. In some instances, max pooling performs the best. Max pooling may be more phase invariant that 12 pooling or average pooling.

When the architecture had frequency convolution, initialization of the time convolution layer was important to preserve locality in frequency. One of the reasons log-mel CLDNNs may match raw waveform performance is because the frequency convolutional layers may require a meaningful representation coming out of the time convolution layer.

As the overall number of LSTM layers is reduced to just 6 DNN layers, the gap between log-mel and raw waveform starts to increase once the architecture has fewer than 2 LSTM layers. Often, any time domain filtering produces phase shifts, which is why max pooling can be used to reduce invariance due to these shifts, as shown in Table 1 above. However, time-convolution is not completely phase invariant. Using LSTMs can potentially further reduce variations to phase shifts. In summary, the strength of the frequency convolution and LSTM layers helps raw waveform and log-mel CLDNNs to have similar performance, and to improve the performance of the current architecture relative to prior neural networks that used raw waveform input.

The joint training of the time convolutional layer and the CLDNN under this architecture may allow for the acoustic model to learn auditory-like filterbanks of bandpass filters whose bandwidth increase with center frequency. After training, the filters are consistently different from both the ERB gammatone initialization and the mel scale, giving more resolution (more filters with lower bandwidths) to low frequencies—the mel scale uses only about 30 filters below 4 kHz, whereas the trained filterbanks use closer to 35 filters in this range.

Such filterbank training may allow the raw waveform CLDNN to adapt available capacity to match the training data. This may, for instance, provide for increased resolution to low frequencies as high frequency regions are mainly dominated by fricatives. Features from these learned filters can be used complementary to log-mel features. As a result of such filterbank learning, a "gammatone clean" filterbank, for example, may occur that consistently provides more filters for lower frequencies than filterbanks that were trained on noisy signals. For instance, the raw waveform CLDNN may allow for this to occur on the basis of finding that high frequency energy is more informative in noisy conditions in helping to discriminate speech from background.

In some aspects, this raw waveform CLDNN architecture provides for enhanced performance in both clean and noisy voice search tasks. In some implementations, the one or more filterbank characteristics that may be adapted in filterbank learning may include the quantity of filters in the filterbank, as well as the center frequencies, transfer functions, cutoff frequencies, roll-off rates, transition bands, and ripples of individual filters in the filterbank.

Figure 3:
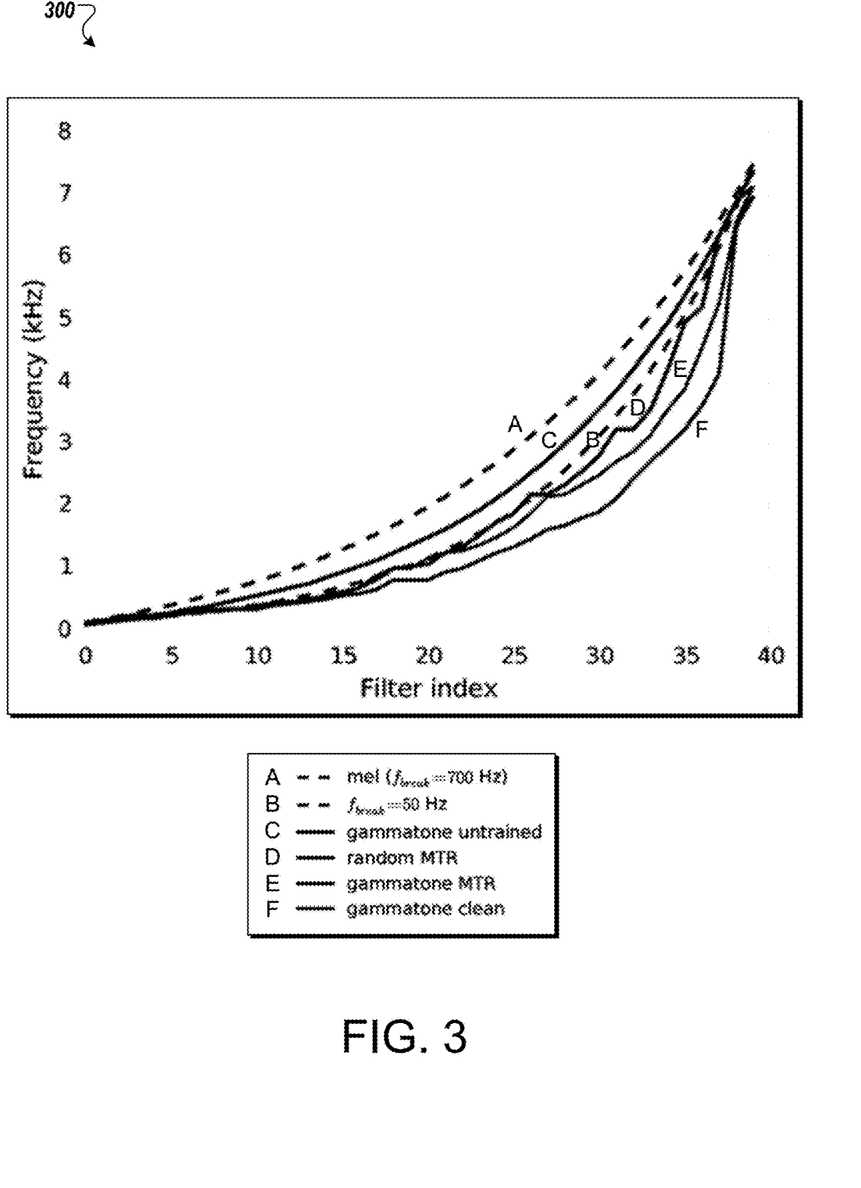
FIG. 3 is a diagram that illustrates analysis of the center frequencies of filters trained on different datasets and initialized differently.

FIG. 3 is a diagram that illustrates analysis 300 of the center frequencies (bin index containing the peak response) of filters trained on different datasets and initialized differently. FIG. 3 also highlights that filterbank learning consistently devotes more filters to low frequencies across different datasets using different training methods, though begin to diverge at higher center frequencies. Notable is the "gammatone clean" filterbank, which consistently uses more filters for lower frequencies than filterbanks trained on noisy signals. This may indicate that the high frequency energy is more informative in noisy conditions in helping discriminate speech from background. These results demonstrate how filterbank training is able to adapt available capacity to match the training data.

The raw waveform CLDNN architectures described above in association with FIGS. 1 and 2 may be trained with cross-entropy criterion, using asynchronous stochastic gradient descent ("ASGD") optimization. In some implementations, one or more of the layers of the raw waveform CLDNN architecture may be initialized using Glorot-Bengio strategies. In these implementations, the LSTM layers of the raw waveform CLDNN architecture may be uniform randomly initialized.

In some implementations, the raw waveform CLDNN architecture may be trained using time-filtered gammatone features. In these implementations, processing at the time convolution layer may include time-domain averaging over a window. In some examples, the time-domain averaging is performed over a 40 millisecond window. In some implementations, LSTM layers may be adapted to reduce variations associated with phase shifts.

Figure 4:
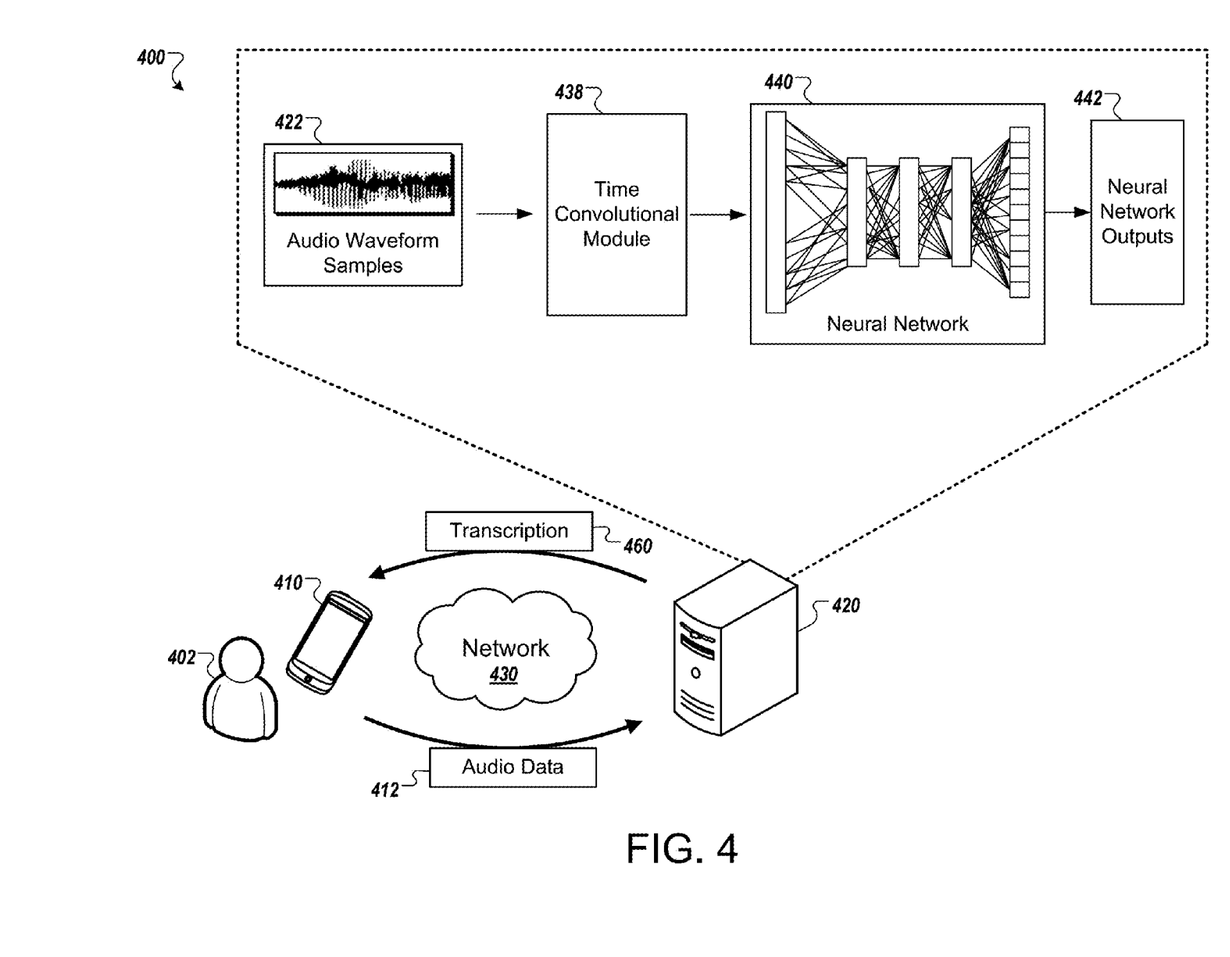
FIG. 4 is a block diagram that illustrates an example of a system 400 for speech recognition using neural networks.

FIG. 4 is a block diagram that illustrates an example of a system 400 for speech recognition using neural networks. The system 400 includes a client device 410, a computing system 420, and a network 430. In the example, the computing system 420 provides information about an utterance and additional information to a neural network 440. The computing system 420 uses output from the neural network 440 to identify a transcription for the utterance.

In some implementations, the computing system 420 receives a set of audio waveform samples. The computing system 420 may generate or otherwise obtain data indicative of a time-frequency representation based on the set of audio waveform samples, for example, by convolving the audio samples with FIR filters. The computing system 420 may provide, as input to a neural network, the time-frequency representation based on a set of audio waveform samples. The computing system 420 may determine a candidate transcription for the utterance based on at least an output of the neural network.

In the system 400, the client device 410 can be, for example, a desktop computer, laptop computer, a tablet computer, a wearable computer, a cellular phone, a smart phone, a music player, an e-book reader, a navigation system, or any other appropriate computing device. The functions performed by the computing system 420 can be performed by individual computer systems or can be distributed across multiple computer systems. The network 430 can be wired or wireless or a combination of both and can include the Internet.

In the illustrated example, a user 402 of the client device 410 speaks, and the client device 410 records audio that includes the speech. The client device 410 transmits the recorded audio signal 412 to the computing system 420 over the network 430.

The computing system 420 receives the audio signal 412 and divides the audio into different frames or groups of audio waveform samples 422. For example, the computing system 420 may identify a set of audio waveform samples 422 that occur within a particular time window within the audio signal 412. These audio waveform samples may be samples as discussed above.

The computing system 420 may provide audio waveform samples 422 to a time convolutional module 438. The time convolutional module 438 may correspond to time convolutional layer 210, as described with respect to FIG. 2 above. As such, the time convolutional module 438 may generate a time-frequency feature representation based on the audio waveform samples 422, e.g., by convolving the samples with one or more filters. The filters can have parameters learned jointly with parameters of the neural network 440 that is used as an acoustic model.

In the illustrated example, the computing system 420 provides output of the time convolutional module 438 to the neural network 440. The neural network 440 has been trained to act as an acoustic model. For example, the neural network 440 indicates likelihoods that time-frequency feature representations correspond to different speech units when the time-frequency feature representations are output by time convolutional module 438 and based on audio waveform samples 422. The neural network 440 may, for instance, correspond to layers 220 to 240, as described with respect to FIG. 2 above. As discussed above, the neural network 440 can include a frequency convolutional layer 220. Frequency convolution is most effective when using feature values that have locality in frequency. The output of the time convolution module 438 has significant locality in frequency, which facilitates further processing by the frequency convolutional layer 220 of the neural network 440.

The neural network 440 produces neural network outputs 442, which the computing system 420 uses to identify a transcription 460 for the audio signal 412. For example, the computing system 420 may provide the neural network outputs 442 to, for example, weighted finite state transducers that approximate a hidden Markov model (HMM), which may include information about a lexicon indicating the phonetic units of words, a grammar, and a language model that indicates likely sequences of words. The output of the HMM can be a word lattice from which the transcription 460 may be derived. The computing system 420 then provides the transcription 460 to the client device 410 over the network 430.

The time convolutional module 438 and the neural network 440 may be jointly trained. That is, the time convolutional module 438 and the neural network 440 each have one or more trainable parameters that are varied during training. In some implementations, the time convolutional module 438 includes a set of filters, e.g., FIR filters, that are convolved with audio samples. Parameters of the filters that may be trained include, for example, the filter length and/or the values of filter coefficients of the filter's transfer function. Parameters of the neural network 440 that can be trained include, for example, weights or coefficients for transitions between neurons. In these implementations, joint training may include providing training data, such as audio waveform samples, to time convolutional module 438 and, in turn, providing time-frequency feature representations to the downstream neural network 440. Target outputs can be identified for the various training examples, e.g., based on phonetic representations of transcriptions for the audio in the training data. The parameters of both the time convolutional module 438 and the neural network 440 can be adjusted to reduce the differences between the outputs of the system and the target outputs. As a result, training occurs concurrently for the neural network 440 and the time convolutional module 438, so that parameters of the neural network 440 are learned as the set of filters of the time convolutional module 438 are learned. In other words, the parameters of time convolutional module 438 and neural network 440 may be trained together, with the feature extraction and acoustic model being trained as a whole rather than independently.

During training, forward propagation through the neural network 440 produces outputs at an output layer of the neural network. The outputs may be compared with data indicating correct or desired outputs that indicate that the received time-frequency feature representation corresponds to a known acoustic state. A measure of error between the actual outputs of the neural network and the correct or desired outputs is determined. The error is then backpropagated through the neural network to update the weights within the neural network 440. In some implementations, the filters of the time convolutional model and all layers of the neural network 440 are trained jointly.

This training process may be repeated for time-frequency feature representation data generated for audio waveform samples of multiple different utterances in a set of training data. During training, the frames selected for training can be selected randomly from a large set, so that frames from the same utterance are not processed consecutively.

Figure 5:
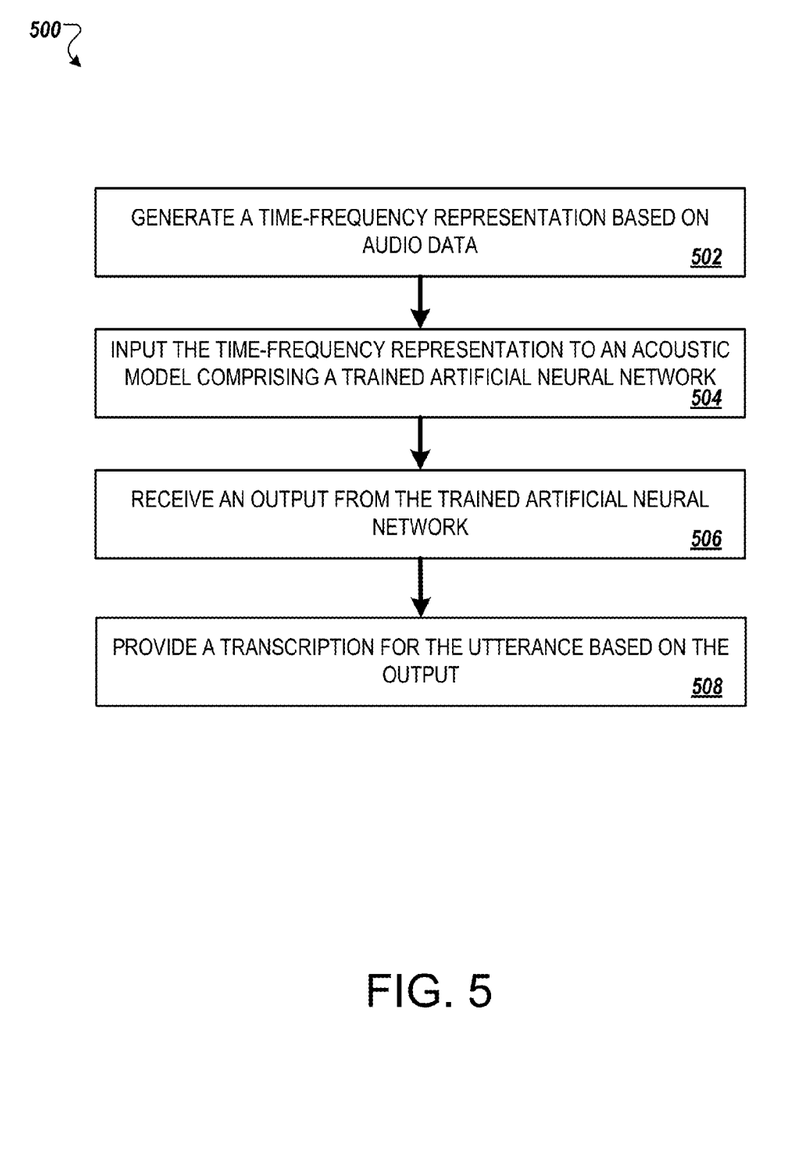
FIG. 5 is a flow diagram that illustrates an example of a process for determining a transcription for an utterance using an output of a trained artificial neural network.

FIG. 5 is a flow diagram that illustrates an example of a process 500 for determining a transcription for an utterance using an output of a trained artificial neural network. The process 500 may be performed by one or more computers, or one or more other processing devices, operating in accordance with the techniques described in association with FIGS. 1, 2, and 4.

In some implementations, audio data that corresponds to an utterance is obtained. The audio data can be a recording of the utterance, or otherwise describe the utterance. For example, the audio data may describe an audio waveform, and may include a plurality of waveform samples, e.g., different time-domain audio samples measured at different points in time. For example, this audio data may be similar to that which has been described in association with raw waveform input 110. In some implementations, the audio data that corresponds to the utterance may be received over a computer network and from a client device. In these implementations, the audio data may represent an utterance detected by a microphone of the client device.

A set of the audio waveform samples that occur within a time window can be identified. In some implementations, identifying the set of the audio waveform samples that occur within a time window includes identifying the audio waveform samples corresponding to a frame. For example, a frame representing 25 ms of audio may include about 400 samples at a 16 kHz sampling rate.

A time-frequency feature representation is generated based on the set of audio waveform samples (502). For example, the time-frequency feature representation can include feature values obtained through time convolution of the audio waveform samples. The audio waveform samples can be convolved with filters, e.g., FIR filters, to generate the feature values. For example, a time-frequency feature representation may be similar to that which has been described in association with the output of the time convolutional layers of FIGS. 1 and 2. In some implementations, the time-frequency representation can include feature values for features that are customized specifically for the acoustic model to be used in recognizing the audio data, e.g., for the particular training state of the neural network in the acoustic model.

In some implementations, generating the time-frequency feature representation based on the set of audio waveform samples may include generating the time-frequency feature representation using a set of multiple learned filters that were trained jointly with the artificial neural network of the acoustic model. For example, the parameters of FIR filters that are convolved with the audio samples may be adjusted during the same training process used to adjust the parameters, e.g., weights of neurons, in the neural network of the acoustic model. Thus, the feature values in the time-frequency feature representation can be values for features that are custom-defined through machine learning for a specific acoustic model, e.g., a specific training state of an acoustic model. As various iterations of training occur, or as different training examples are propagated through the neural network, both the parameters that define the filters and the parameters of the neural network are adjusted. As a result, for example, the feature definitions can change so that the meaning of feature values input to the neural network can change during the training process. Rather than beginning training with a fixed type of feature to extract from audio data and using a consistent, predetermined type of feature throughout training, the nature of the features can vary depending on the set of training examples used. The feature extraction portion of the system, which converts audio samples to inputs to the neural network, can thus be adjusted jointly with the neural network so that to learn feature types that best indicate what words were spoken. As a result, during training, the system can learn which characteristics of audio reduce word error rates in speech recognition, rather than requiring the designer of a speech recognition to specify in advance what audio information should be passed to a neural network of an acoustic model.

In implementations where identifying the set of the audio waveform samples that occur within a time window comprises identifying the audio waveform samples corresponding to a frame, generating the time-frequency feature representation based on the set of audio waveform samples may include convolving the audio waveform samples corresponding to the frame with each filter in a set of multiple finite impulse response filters in a filterbank, collapsing outputs of the filterbank using a pooling function to discard short-term phase information and generate an output for each of the filters with respect to the frame, applying a non-linear rectifying function to the collapsed filterbank outputs, applying a stabilized logarithm compression function to the rectified outputs, and determining, as the time-frequency feature representation, a frame-level feature vector comprising the outputs of the stabilized logarithm compression function. In some aspects, generating the time-frequency feature representation based on the set of audio waveform samples may include inputting waveform samples from the audio data to a time convolutional module; and receiving an output from the time convolutional module.

Typically, when performing time domain processing, there are significant variations in the timing of different speech segments, for example, due to different speaking rates. Nevertheless, it is desirable that the same sound produces the same result and classification, regardless of the speaking rate. Time convolution helps reduce these variations. For example, the time convolution outputs can be pooled in time to reduce variations in time and variations in phase. As an example, two audio segments could have the same sound, but simply have a phase shift relative to each other, and it would be desirable to recognize the sound consistently regardless of the phase shift. The pooling function of the time convolution module reduces sensitivity to phase shifts, and the LSTM layers of the neural network further reduce sensitivity of the speech recognition process to phase shifts.

The time-frequency feature representation is provided as input to an acoustic model comprising a trained artificial neural network (504). The acoustic model may comprise (i) a frequency convolution layer (ii) a memory layer, and (iii) one or more hidden layers. For example, the layers of this acoustic model may be similar to those which have been described above in association with the CLDNN. In some implementations, the memory layer comprises one or more long short-term memory layers, such as those which have been described in association with FIG. 2. Memory layers, such as LSTM layers, are often effective to reduce the variations in the time domain that may hinder accurate recognition.

The acoustic model may, for instance, further include multiple long short-term memory layers, and wherein the output of at least one of the long short-term memory layers is input to another of the long short-term memory layers. For instance, the artificial neural network may be an artificial neural network in which a first long short-term memory layer receives input from the frequency convolution layer, the first long short-term memory layer provides output to a series of one or more other long short-term memory layers, and the output from the series of one or more other long short-term memory layers is provided to a deep neural network. The artificial neural network may be trained using sequence training, cross-entropy training, or truncated backpropagation through time.

In this context, a long short-term memory layer is part of a recurrent neural network architecture. Long short-term memory nodes can include gates that determine when to remember values, when to continue to remember or forget values, and when to output values. In addition, long short-term memory can remember values for one, two, three, or more cycles of propagation through the neural network. In some implementations, the long-short-term memory layers can have a memory for a duration fixed before training or a duration that can vary and be set during training.

The trained artificial neural network can be one that was trained jointly with the filters or other aspects used in the feature extraction process. Training of the neural network can set parameters, such as transition weights between neurons, based on training examples that include audio data and corresponding transcriptions. The definition of features used to determine the time-frequency representation can be adjusted in the same training process used to adjust the neural network. In some instances, parameters for both feature extraction from raw audio waveforms and parameters for any or all layers of the neural network can be adjusted over multiple iterations.

An output that is indicative of a likelihood that the set of audio waveform samples corresponds to a phonetic unit is received from the trained artificial neural network of the acoustic model (506). For example, this output may be similar that that which has been described above in association with the output of the CLDNN, e.g., predicted context dependent state output targets. In some implementations, the output of the acoustic model indicates a likelihood that a portion of the utterance corresponding to the identified features represents a particular context-dependent state. For example, the context-dependent state may be a context-dependent hidden Markov model state corresponding to a portion or state of a phoneme.

A transcription for the utterance is provided based on the output of the trained artificial neural network is determined (508). For example, this may include providing data indicating the transcription over the computer network and to the client device. In some examples, the data indicating the transcription may be displayed at a screen of the client device.

In some implementations, an acoustic model can be trained to use feature values for (i) customized features learned during training, as well as (ii) predefined features that are set before training occurs, such as log-mel features. Feature values for both types of features can be determined from the same audio samples and provided together to the acoustic model to recognize an utterance. For example, log-mel features described above may be determined based on the audio waveform samples. In these implementations, data indicating the log-mel features may be provided to the acoustic model. In addition, the output received from the trained artificial neural network of the acoustic model may be based on (i) the time-frequency feature representation and (ii) the log-mel features.

In addition to the operations of FIG. 5, multiple different sets of the audio waveform samples that occur in different consecutive time windows may be identified in some implementations. In these implementations, the transcription for the utterance may be determined based on the outputs of the trained artificial neural network for each of the different consecutive time windows.

Figure 6:
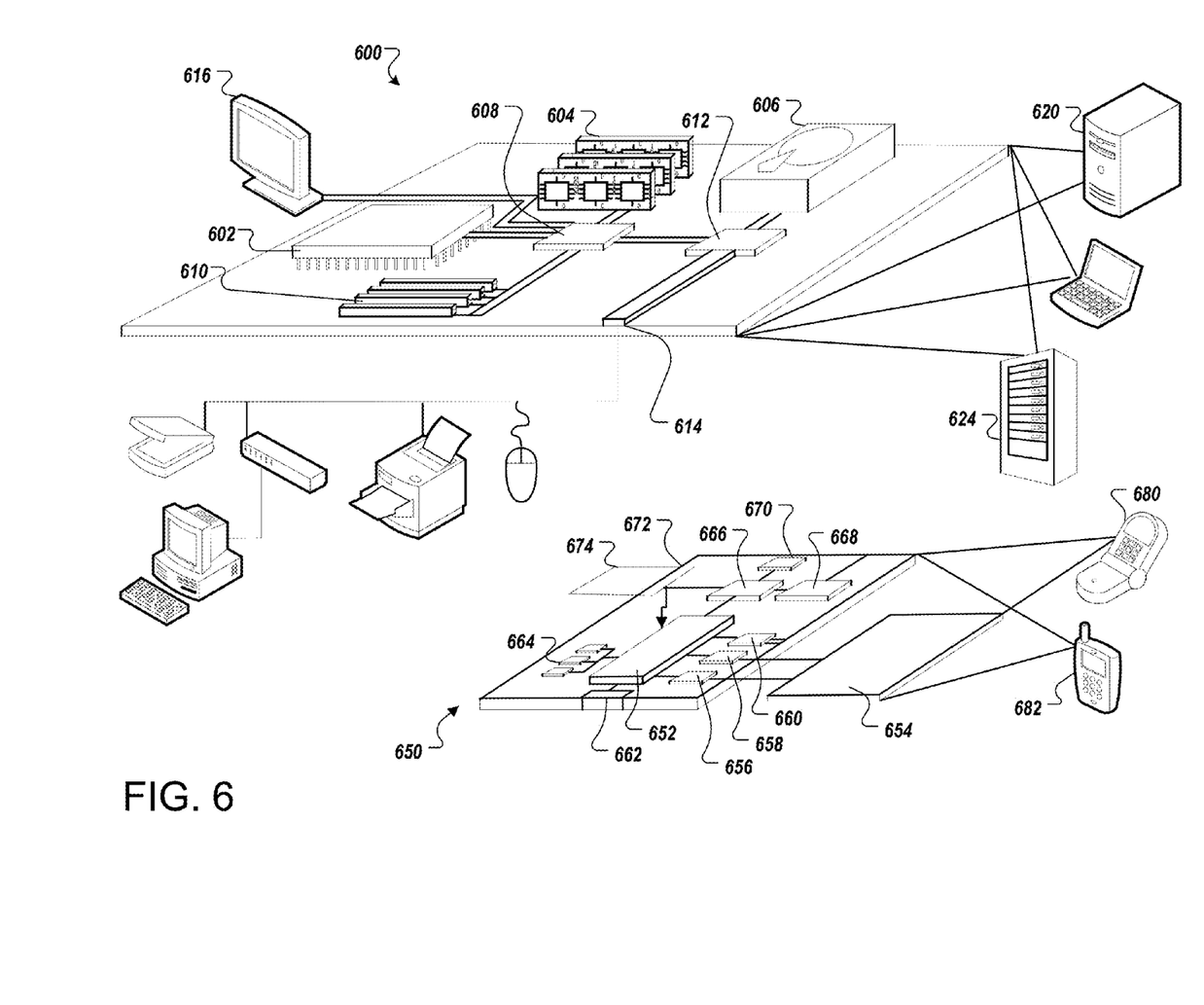
FIG. 6 is a schematic diagram that shows an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations, e.g., as a server bank, a group of blade servers, or a multi-processor system.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices, for example, processor 602, perform one or more methods, such as those described above. The instructions can also be stored by one or more storage devices such as computer- or machine-readable mediums, for example, the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616, e.g., through a graphics processor or accelerator, and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 568, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices, for example, processor 652, perform one or more methods, such as those described above. The instructions can also be stored by one or more storage devices, such as one or more computer- or machine-readable mediums, for example, the memory 664, the expansion memory 674, or memory on the processor 652. In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound, e.g., voice messages, music files, etc., and may also include sound generated by applications operating on the mobile computing device 650.

The mobile computing device 650 may be implemented in a number of different forms, as shown in the figure. For example, it may be implemented as a cellular telephone 680. It may also be implemented as part of a smart phone 682, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
one or more computers and one or more data storage devices storing instructions that are operable, when executed by the one or more computers, to cause the one or more computers to perform operations comprising:
generating a time-frequency feature representation based on audio data by convolving samples of audio waveform data with one or more filters in the time domain;
inputting the time-frequency feature representation to an acoustic model comprising a trained artificial neural network, the trained artificial neural network comprising a frequency convolution layer, a memory layer, and one or more hidden layers;
receiving, from the acoustic model, an output that is based on output of the trained artificial neural network and that is indicative of a likelihood that the audio data corresponds to a phonetic unit; and
providing a transcription for the audio data that is determined based on the output of the acoustic model.

2. The system of claim 1, wherein the memory layer comprises a long short-term memory layer.

3. The system of claim 2, wherein the acoustic model comprises multiple long short-term memory layers, and wherein the trained artificial neural network is configured such that output of at least one of the long short-term memory layers is input to another of the long short-term memory layers.

4. The system of claim 1, wherein the artificial neural network is an artificial neural network in which:
a first long short-term memory layer receives input from the frequency convolution layer,
the first long short-term memory layer provides output to a series of one or more other long short-term memory layers, and
the output from the series of one or more other long short-term memory layers is provided to a series of multiple hidden neural network layers.

5. The system of claim 1, wherein the operations further comprise receiving the audio data from a client device over a network;
wherein providing the transcription for the audio data comprises providing the transcription to the client device over the network, for display at the client device.

6. The system of claim 1, wherein generating the time-frequency feature representation comprises:
convolving time-domain features of audio waveform samples with each of a plurality of finite impulse response filters; and time averaging the results of the convolution over a particular time window.

7. The system of claim 1, wherein generating the time-frequency feature representation comprises:
generating the time-frequency feature representation using a set of multiple learned filters that were trained jointly with the artificial neural network of the acoustic model.

8. The system of claim 1, wherein the operations further comprise:
obtaining audio data that includes a plurality of audio waveform samples; and
identifying a particular set of the audio waveform samples that occur within a time window;
wherein generating the time-frequency representation comprises generating the time-frequency representation based on the particular set of audio waveform samples.

9. The system of claim 8, wherein identifying the particular set of the audio waveform samples that occur within the time window comprises identifying the audio waveform samples corresponding to a frame; and
wherein generating the time-frequency feature representation based on the particular set of audio waveform samples comprises:
convolving the audio waveform samples corresponding to the frame with each filter in a set of multiple finite impulse response filters in a filterbank;
collapsing outputs of the filterbank using a pooling function to discard short-term phase information and generate an output for each of the filters with respect to the frame;
applying a non-linear rectifying function to the collapsed filterbank outputs;
applying a stabilized logarithm compression function to the rectified outputs; and
determining, as the time-frequency feature representation, a frame-level feature vector comprising the outputs of the stabilized logarithm compression function.

10. The system of claim 8, wherein the operations further comprise:
determining log-mel features based on the audio waveform samples that occur within the time window; and
providing data indicating the log-mel features to the acoustic model;
wherein receiving an output from the trained artificial neural network of the acoustic model comprises receiving an output from the trained artificial neural network that is based on (i) the time-frequency feature representation and (ii) the log-mel features.

11. The system of claim 1, wherein the output of the acoustic model indicates a likelihood that a portion of the utterance corresponding to the identified features represents a particular context-dependent state.

12. The system of claim 11, wherein the context-dependent state is a context-dependent hidden Markov model state corresponding to a phoneme or a portion of a phoneme.

13. The system of claim 1, wherein the artificial neural network has been trained using sequence training, cross-entropy training, or truncated backpropagation through time.

14. The system of claim 1, wherein the operations further comprise identifying, in the audio data, multiple different sets of audio waveform samples that occur in different consecutive time windows; and
repeating the generating, inputting, and receiving steps for each of the multiple different sets of audio waveform samples to obtain an output of the artificial neural network for each of the different consecutive time windows;
wherein determining the transcription for the utterance is comprises determining the transcription for the utterance based on the outputs of the trained artificial neural network for each of the different consecutive time windows.

15. The system of claim 1, wherein obtaining audio data corresponding to an utterance comprises receiving, over a computer network and from a client device, audio data representing an utterance detected by a microphone of the client device; and
wherein providing the transcription comprises providing, over the computer network and to the client device, data indicating the transcription for display at a screen of the client device.

16. The system of claim 1, wherein the time-frequency feature representation is not a log-mel feature.

17. A method performed by data processing apparatus, the method comprising:
generating a time-frequency feature representation based on audio data by convolving samples of audio waveform data with one or more filters in the time domain;
inputting the time-frequency feature representation to an acoustic model comprising a trained artificial neural network, the trained artificial neural network comprising a frequency convolution layer, a memory layer, and one or more hidden layers;
receiving, from the acoustic model, an output that is based on output of the trained artificial neural network and that is indicative of a likelihood that the audio data corresponds to a phonetic unit; and
providing a transcription for the audio data that is determined based on the output of the acoustic model.

18. The method of claim 17, wherein the trained artificial neural network comprises multiple long short-term memory layers, and wherein the output of at least one of the long short-term memory layers is input to another of the long short-term memory layers.

19. A non-transitory computer-readable storage device that stores instructions that, when executed by one or more processors, cause the one or more processors to perform operations comprising:
generating a time-frequency feature representation based on audio data by convolving samples of audio waveform data with one or more filters in the time domain;
inputting the time-frequency feature representation to an acoustic model comprising a trained artificial neural network, the trained artificial neural network comprising a frequency convolution layer, a memory layer, and one or more hidden layers;
receiving, from the acoustic model, an output that is based on output of the trained artificial neural network and that is indicative of a likelihood that the audio data corresponds to a phonetic unit; and
providing a transcription for the audio data that is determined based on the output of the acoustic model.

20. The non-transitory computer-readable storage device of claim 19, wherein the trained artificial neural network comprises multiple long short-term memory layers, and wherein the output of at least one of the long short-term memory layers is input to another of the long short-term memory layers.

* * * * *

UNITED STATES PATENT AND TRADEMARK OFFICE
CERTIFICATE OF CORRECTION

PATENT NO. : 10,403,269 B2  
APPLICATION NO. : 15/080927  
DATED : September 3, 2019  
INVENTOR(S) : Tara N. Sainath It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 656 days.

Signed and Sealed this  
Seventh Day of July, 2020

Andrei Iancu  
*Director of the United States Patent and Trademark Office*